A. W. CURRY.
NUT LOCK.
APPLICATION FILED OCT. 26, 1910.
995,058.
Patented June 13, 1911.
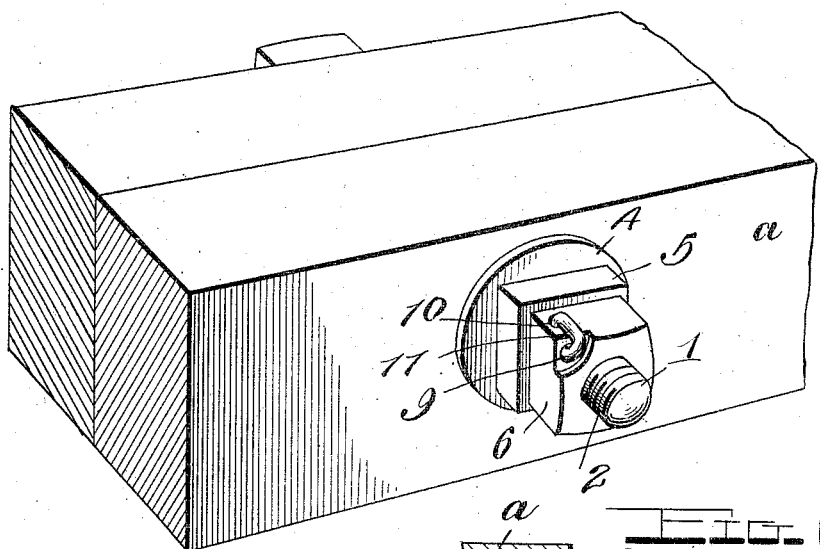
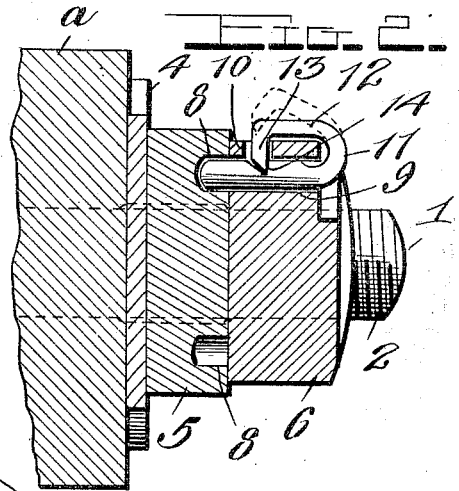
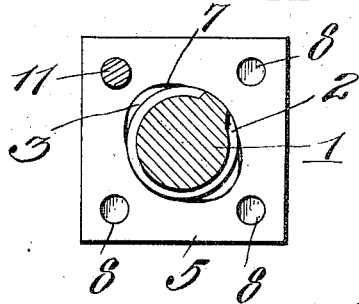
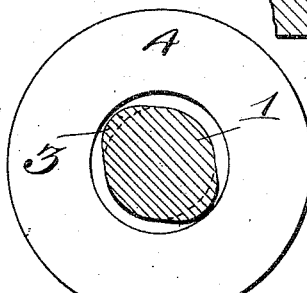
Witnesses
Inventor
A. W. Curry,
By Watson E. Coleman.
Attorney

UNITED STATES PATENT OFFICE.

ANSON W. CURRY, OF STAUNTON, VIRGINIA.

NUT-LOCK.

995,058. Specification of Letters Patent. Patented June 13, 1911.

Application filed October 26, 1910. Serial No. 589,165.

*To all whom it may concern:*

Be it known that I, ANSON W. CURRY, a citizen of the United States, residing at Staunton, in the county of Augusta and State of Virginia, have invented certain new and useful Improvements in Nut-Locks, of which the following is a specification, reference being had to the accompanying drawings.

This invention relates to improvements in nut locks, and consists in the construction, combination and arrangement of devices hereinafter described and claimed.

The object of the invention is to provide an improved nut locking device consisting of a washer and base for application on a bolt, under the nut, and the provision of the nut with a locking pin, of novel construction, which may be engaged with any one of a number of openings, with which the base is provided, so as to prevent the nut from turning and may also be secured to the nut so as to prevent the pin from becoming disengaged therefrom, and lost, a further object of the invention being to provide an improved nut locking device which may be very readily and cheaply manufactured, and which may be easily applied to a bolt and nut, to prevent the nut from working loose on the bolt.

In the accompanying drawings—Figure 1 is a perspective view of a bolt provided with nut locking devices constructed in accordance with my invention. Fig. 2 is a sectional view on a plane disclosing the locking pin, the said locking pin being shown in elevation and its locking arm being shown in engaged position in full lines, and in disengaged position in dotted lines. Fig. 3 is a sectional view on a plane disclosing the base piece. Fig. 4 is a similar view on a plane disclosing the washer.

In accordance with my invention, I provide a bolt 1 which is otherwise of usual construction, and is provided at the inner end of its screw threaded portion 2, with a shoulder 3 which is here shown as oval or elliptical form. In connection with the bolt, I also provide a washer 4, which may be of any suitable thickness. In practice, I provide several of these washers which vary in thickness, so that any one of them may be used as required.

The washer bears on one side of the block or other object *a* through which the bolt extends, the said bolt passing through the central opening in the washer and on the outer side of the washer is placed a base piece 5, which is similar in shape to the nut 6, but is somewhat larger. This base piece is provided with an opening 7 through which the shouldered portion 3 of the bolt extends, the said opening being oval or of other suitable shape, to fit the said shouldered portion of the bolt, and prevent the said base piece from turning on the bolt. The said base piece is provided in its outer side with a series of recesses 8 of suitable depth, which recesses preferably do not extend entirely through the base piece, and any suitable number of the said recesses may be provided and they may be disposed at any desired distance apart.

The nut 6 is provided near one corner with a transverse opening 9, which may register with any one of the openings 8 of the base piece as the nut is turned on the bolt, and the said nut is also provided in one side with an opening 10 at right angles to and which communicates with the opening 9. I also provide a locking pin 11 for insertion in the opening 9, and which may be engaged with any one of the openings 8 of the base piece, in order to lock the nut to the base piece, and hence prevent the nut from working loose on the bolt. This pin is preferably made of malleable iron. This locking pin is provided at its outer end with an arm 12 which is bent as shown and is provided on one side of its outer terminal with a stud 13 which after the arm 12 has been bent over one side of the nut 6, may pass through the opening 10 in the nut, and engage a notch 14 on one side of the locking pin. In order to thus engage the stud of the arm 12 with the opening 10, and the notch 14, the said arm 12 is bent as required by a hammer or other suitable instrument.

It will be understood that by reason of the engagement of the studded end of the arm 12 with the opening 10 of the nut, and the notch 14 of the locking pin, the locking pin cannot be withdrawn from the nut, and hence cannot be withdrawn from the opening 8 in the base piece with which it is engaged, and so the locking pin coacts with the nut and with the base piece to firmly lock the nut in place so that it cannot work loose or become casually disengaged from the bolt. Owing to the fact that the locking pin with its arm 12 is made of wrought or malleable iron, the arm may be straightened out at any time to the extent required to disengage its stud 13 from the opening 10 of the nut, and the notch 14 of the locking pin in order to permit the locking pin to be withdrawn from the nut, and from the recess 8 of the base piece with which it is engaged so as to permit the nut to be taken off from the bolt or adjusted. The pin may be used a number of times since the malleable material of which it is constructed admits of the arm 12 being bent repeatedly before the same will break.

In applying the nut, should it be found that when the nut is screwed up to the base piece, its opening 9 will not register with any one of the openings 8, a thicker or thinner washer will then be used, so as to cause the opening 9 when the nut is fully screwed up to coincide with one of the recesses 8.

It will be understood from the foregoing that my improved nut lock is very cheap and simple, is very strong and durable, is very effective in preventing the nut from working loose on the bolt and that the same is very strong and durable and may be used a number of times.

I claim:—

1. In combination with a bolt and a base piece having means to prevent the base piece from turning on the bolt, said base piece being provided in its outer side with locking recesses, a nut on the bolt to screw against the base piece and provided with a transverse opening and with a locking opening communicating with said transverse opening, and a locking pin in the transverse opening of the nut and to engage one of the recesses of the base piece, the said transverse pin having a reversely bent arm at its outer end, to extend on one side of the nut, and provided with a stud to enter the locking opening of the nut, and prevent the withdrawal of the locking pin.

2. In combination with a bolt and a base piece having means to prevent the base piece from turning on the bolt, said base piece being provided in its outer side with locking recesses, a nut on the bolt to screw against the base piece and provided with a transverse opening and with a locking opening communicating with said transverse opening, and a locking pin in the transverse opening of the nut, and to engage one of the recesses of the base piece, the said transverse pin having a reversely bent arm at its outer end, to extend on one side of the nut and provided with a stud to enter the locking opening of the nut and prevent the withdrawal of the locking pin, the said locking pin being further provided in one side with a notch for engagement by the said stud.

3. In combination with a bolt and a base piece having means to prevent the base piece from turning on the bolt, said base piece being provided in its outer side with locking recesses, a nut on the bolt to screw against the base piece and provided with a transverse opening and with a locking opening communicating with said transverse opening, and a locking pin in the transverse opening of the nut and to engage one of the recesses of the base piece, the said transverse pin having a reversely bent arm at its outer end, to extend on one side of the nut, and prevent the withdrawal of the locking pin, and a washer of suitable thickness on the inner side of the base piece.

In testimony whereof I hereunto affix my signature in the presence of two witnesses.

ANSON W. CURRY.

Witnesses:
GEO. S. LIVINGSTON,
M. K. REEDER.